W. ZIERVOGEL.
Roasting Ores.
No. 15,542.
Patented Aug. 12, 1856.
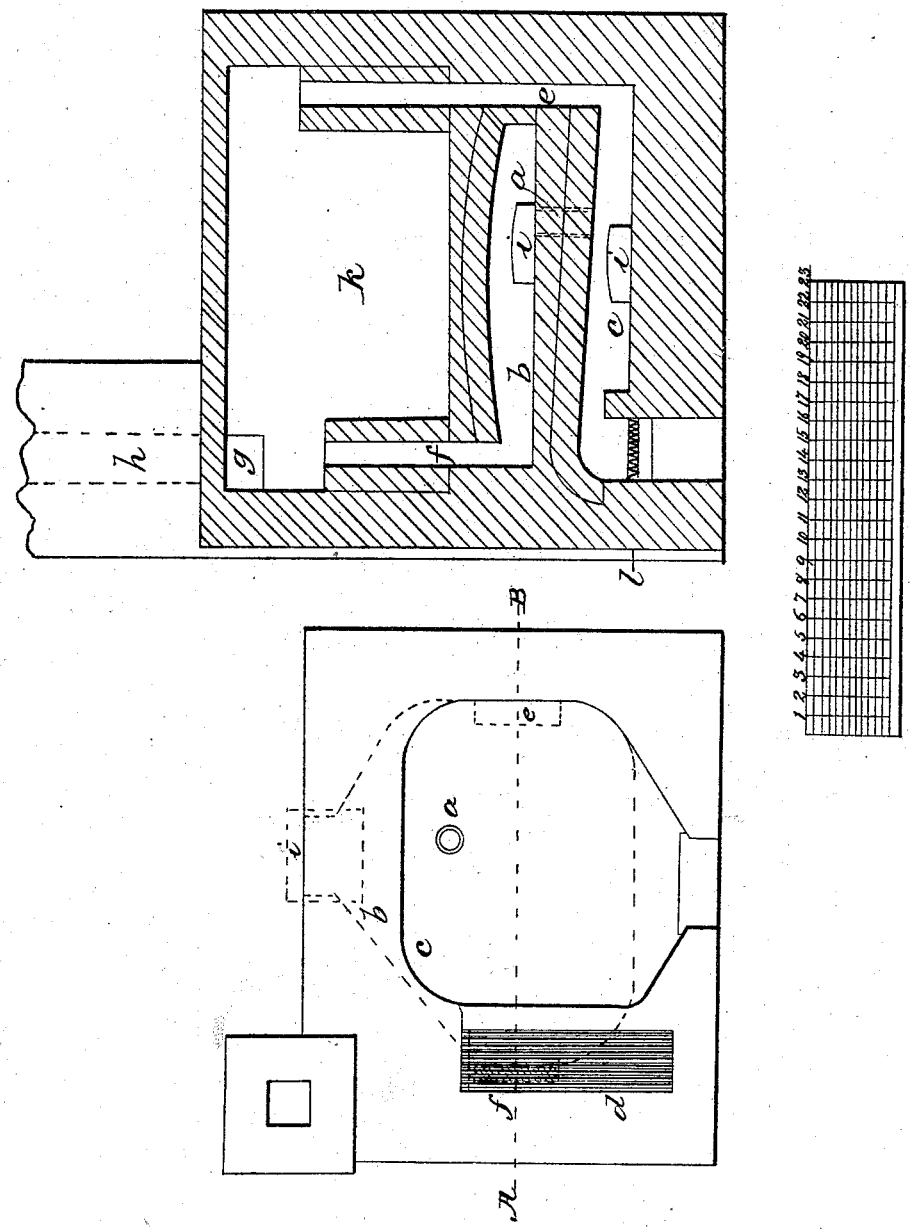

UNITED STATES PATENT OFFICE.

W. ZIERVOGEL, OF TRESCKOW, PENNSYLVANIA.

IMPROVEMENT IN PROCESSES OF SEPARATING SILVER FROM THE ORE.

Specification forming part of Letters Patent No. 15,542, dated August 12, 1856.

*To all whom it may concern:*

Be it known that I, WILHELM ZIERVOGEL, of Tresckow, Carbon county, State of Pennsylvania, have invented a new and Improved Process of Separating Silver from Copper and other Ores; and I do hereby declare that the following is a full and correct description thereof.

The nature of my invention consists in the use of water or a solution of sulphate of copper slightly impregnated with sulphuric acid instead of lead, salt, or any other medium for the said separation; and to enable others skilled in the art to use my invention, I describe the same as follows:

The copper or other ores are to be pulverized, and then heated in a calcining-furnace containing two hearths or platforms, one over the other, both communicating by an opening which can be closed, the fire having no access to the upper one, the lower, however, having passing over it the flame of a fire which is made at the side or end of the lower platform, but is separated from it so that the flame passes merely over such lower platforms. The upper bed, B, is connected with the lower bed, C, by means of an opening, A, through the arch forming the roof of the lower bed being cleared. Then another charge, partially calcined on the upper bed, is let down through the indicated opening A. Atmospheric air required for oxidation enters through the working-door I, and sulphurous fumes, as they are formed, are drawn off into the chamber K, and are ultimately got rid of through the stack H. In the chamber K metallic particles carried away by the strong draft will deposit, and are from time to time cleared out and mixed for further calcination with the raw material. The furnace is lined on the inside with fire-brick, and the heating materials may be either fossil coal or wood. The pulverized ore is to be put first on the upper platform, stirred continually, and heated with a slowly-increased heat. After two hours and a half, thirty-five per cent. of the sulphur contained in the ore is oxidized. Now it is to be mixed with six per cent. (of the original weight of ore placed in the furnace) of small pieces of coke, and the stirring of the glowing mass is continued until the calcining process on the lower platform is finished and the mass is drawn out. The time required by a quantity of five hundred pounds of ore, on an average, is two to three hours, and then put on the lower platform, where it is to be spread, and has to be heated from two to three hours, being continually stirred and kept red-hot until there is not a particle of iron left, the sulphates of iron having been decomposed, (which may easily be ascertained by the application of water to a sample taken from the platform and mixed with ferro-cyanide of kalium.) As soon as all the particles of sulphates of iron have disappeared, the calcination is finished, the heated mass is taken out, and when cooled down to 80° Reaumur, it is put into vats ready for the extraction process; however, the cinders are previously separated from the calcined ore by means of screening.

For the purpose of extraction vats are fitted with strainers two inches and a half from the bottom and covered with linen. The calcined mass is placed on the strainer, and on it is guided water heated to from 70° to 80° Reaumur. The liquid which passes through the filter contains sulphates of silver, of copper, and perhaps other metals. It flows into a second filter, fitted in the same way as above mentioned; but on the strainer are placed pieces of copper, which by chemical affinity for sulphuric acid precipitate the silver, viz: The predominate chemical affinity between the sulphates and metallic copper begins to act, the copper decomposes the sulphate of silver, and metallic silver is formed. About eight per cent. of the weight of the raw uncalcined ore may on an average be taken as the quantum of water lost in the operation.

The process may be shortened by mixing with the water a solution of sulphate of copper slightly impregnated with sulphuric acid; but great care must be taken that the water does not contain more than twelve per cent. of sulphate of copper, because the water itself generating sulphate of copper too much of it may be created. The heated water, or a solution of sulphate of copper slightly impregnated with sulphuric acid, is to be conducted on and through the calcined ore as long as it yields soluble sulphate of silver, which the usual test with salt-water easily proves.

The silver obtained by this process consists of a very fine powder, and can be purified either by water or in a glowing heat, in which the other metals oxidize and change to dross.

The water used for the extraction, and impregnated with sulphate of copper, can again be employed for the same purpose, or may be evaporated in order to extract the sulphate of copper in soluble form as a secondary product.

The ore thus treated can also be used for manufacturing sulphate of copper by employing water and sulphuric acid, or it may be smelted for its metal, and the copper thus obtained is easily refined.

What I claim as my invention, and desire to secure by Letters Patent, is—

The application of water or a solution of sulphate of copper slightly impregnated with sulphuric acid instead of lead, quicksilver, or salt hitherto used for this purpose, to the process of separating silver from copper and other ores, rendering thereby this separation easier, shorter, less expensive, and not noxious to the health of the operator.

W. ZIERVOGEL.

Witnesses:
 LEWIS LUBRECHT,
 G. C. LEWIS DENGENHARDT.